United States Patent
Kim et al.

(10) Patent No.: US 8,714,287 B2
(45) Date of Patent: May 6, 2014

(54) POWER TRAIN OF HYBRID VEHICLE

(75) Inventors: Kyungha Kim, Yongin (KR); Yeonho Kim, Suwon (KR); Wansoo Kim, Hwaseong (KR)

(73) Assignee: Hyundai Motor Company, Seoul (KR)

( * ) Notice: Subject to any disclaimer, the term of this patent is extended or adjusted under 35 U.S.C. 154(b) by 340 days.

(21) Appl. No.: 12/619,214

(22) Filed: Nov. 16, 2009

(65) Prior Publication Data

US 2010/0133026 A1 Jun. 3, 2010

(30) Foreign Application Priority Data

Dec. 2, 2008 (KR) .................. 10-2008-0121362

(51) Int. Cl.
*B60K 6/42* (2007.10)

(52) U.S. Cl.
USPC ............... 180/65.22; 180/65.25; 180/65.265

(58) Field of Classification Search
USPC ............ 180/65.21, 65.265, 165, 53.8, 65.25, 180/65.26, 65.28, 65.22; 477/5, 7
See application file for complete search history.

(56) References Cited

U.S. PATENT DOCUMENTS

| | | | | |
|---|---|---|---|---|
| 3,744,606 A | * | 7/1973 | Bucksch | 192/48.618 |
| 4,533,011 A | * | 8/1985 | Heidemeyer et al. | 180/65.25 |
| 5,285,111 A | | 2/1994 | Sherman | |
| 5,635,805 A | * | 6/1997 | Ibaraki et al. | 180/65.25 |
| 5,713,814 A | * | 2/1998 | Hara et al. | 180/65.25 |
| 5,735,770 A | * | 4/1998 | Omote et al. | 477/5 |
| 5,934,396 A | * | 8/1999 | Kurita | 180/65.25 |
| 6,019,183 A | * | 2/2000 | Shimasaki et al. | 180/165 |
| 6,229,563 B1 | * | 5/2001 | Miller et al. | 348/83 |
| 6,308,794 B1 | * | 10/2001 | Oppitz | 180/65.25 |
| 6,336,889 B1 | * | 1/2002 | Oba et al. | 477/5 |
| 6,668,953 B1 | * | 12/2003 | Reik et al. | 180/53.8 |
| 7,753,150 B2 | * | 7/2010 | Tamor | 180/65.265 |
| 7,814,432 B2 | * | 10/2010 | Ashe et al. | 715/810 |
| 7,885,737 B2 | * | 2/2011 | Hirata et al. | 180/65.21 |
| 8,095,254 B2 | * | 1/2012 | Heap et al. | 180/65.265 |
| 8,322,503 B2 | * | 12/2012 | Combes et al. | 180/65.25 |
| 2007/0213163 A1 | | 9/2007 | Combes et al. | |

FOREIGN PATENT DOCUMENTS

| | | |
|---|---|---|
| CN | 1847042 A | 10/2006 |
| DE | 10160466 C1 | 6/2003 |
| EP | 1236919 A1 | 9/2002 |
| JP | 2001113971 A | 4/2001 |
| JP | 2003063264 A | 3/2003 |
| JP | 2003-247610 A | 9/2003 |

(Continued)

OTHER PUBLICATIONS

Office Action for Chinese Application No. 200910225224.1, dated Jun. 27, 2013.

*Primary Examiner* — Hau Phan
(74) *Attorney, Agent, or Firm* — Edwards Wildman Palmer LLP; Peter F. Corless

(57) ABSTRACT

According to the present invention, since a rotor shaft of a motor can be connected/disconnected with/from an input shaft of a transmission, it is possible to reduce or block vibration and noise between the motor and the transmission, thereby improving durability of the motor and achieving smooth gearshift. Further, when a vehicle is driven with the engine directly connected with the input shaft of the transmission, it is possible to easily implement driving sub-control and regenerative braking control by the motor, thereby achieving good properties against noise and vibration.

2 Claims, 3 Drawing Sheets

(56) References Cited

FOREIGN PATENT DOCUMENTS

| JP | 2003-301895 | A | 10/2003 |
| JP | 2006306327 | A | 11/2006 |
| JP | 2006315662 | A | 11/2006 |
| KR | 10-2006-0072615 | A | 6/2006 |

* cited by examiner

PRIOR ART

POWER TRAIN OF HYBRID VEHICLE

CROSS-REFERENCE TO RELATED APPLICATIONS

The present application is based on, and claims priority from, Korean Application Serial Number 10-2008-0121362, filed on Dec. 2, 2008, the disclosure of which is hereby incorporated by reference herein in its entirety.

TECHNICAL FIELD

The present invention relates to a power train of a hybrid vehicle that can improve durability of a motor thereof and achieve smooth gearshift.

BACKGROUND ART

A hybrid power train used in a vehicle including an engine, a motor, and a transmission transmits the power of the motor and the power of the engine to the driving wheels through the transmission. Typically, it is configured such that a rotor of the motor is directly connected to the input shaft of the transmission and the power of the engine is transmitted to the input shaft of the transmission via a torsional damper and an engine clutch.

For example, as shown in FIG. 1, an engine clutch 502 is mounted inside a rotor 500 of a motor to transmit the engine power, which is inputted through a torsional damper 508 fitted on a front shaft 506 disposed in series coaxially with a transmission input shaft 504, to the transmission input shaft 504 by connecting/disconnecting operation. Further, the rotor 500 of the motor can always transmit power to the transmission input shaft 504 because a rotor shaft 510 is locked to a clutch retainer 512 of the engine clutch 502.

The above-described power train has drawbacks, however. For instance, vibration of the motor and/or engine is all transmitted to the transmission. Also, when gear shift occurs and required torque changes in re-acceleration after deceleration, it is difficult to control corresponding vibration and achieve smooth gearshift. Further, shock from the driving wheels or gearshift shock is fully transmitted to the motor, such that the durability of the motor is deteriorated. Moreover, when the vehicle is driven with the engine directly connected with the transmission input shaft 504, driving sub-control and regenerative braking control using the motor are difficult, such that it is difficult to ensure good anti-noise and anti-vibration properties.

The above information disclosed in this Background Art section is only for enhancement of understanding of the background of the invention and therefore it may contain information that does not form the prior art that is already known in this country to a person of ordinary skill in the art.

SUMMARY

Embodiments of the present invention provide a power train of a hybrid vehicle that makes it possible to reduce or block vibration and noise between the motor and the transmission, thereby improving durability of the motor and achieving smooth gearshift by having a configuration in which a rotor shaft of a motor can be connected/disconnected with/from an input shaft of a transmission. Further, when a vehicle is driven with the engine directly connected with the input shaft of the transmission, it is possible to easily implement driving sub-control and regenerative braking control by the motor, thereby achieving good properties against noise and vibration.

A power train of a hybrid vehicle according to an embodiment includes an internal combustion engine, a motor that is driven by electric energy; a first clutch that selectively transmits power of the engine to a transmission input shaft, and a second clutch that selectively transmits power of the motor to the transmission input shaft.

The power train may be configured such that the first clutch is disposed radially inside a rotor of the motor, and the second clutch is disposed radially inside the rotor of the motor, having a larger diameter than the first clutch.

The power train may be configured such that a front shaft is coaxially disposed in series at the front end of the transmission input shaft, the front shaft is provided with a torsional damper connected with the engine, the first clutch includes a hub connected to the front shaft, a retainer connected to the transmission input shaft, and a plurality of clutch plates and clutch discs disposed between the hub and the retainer. The second clutch includes the retainer, a rotor shaft of the motor, and a plurality of clutch plates and clutch discs disposed between the retainer and the rotor shaft of the motor.

The power train may be configured such that the inner circumference of the rotor shaft of the motor is supported by the outside of the front shaft through a first bearing and the outer circumference is supported by a transmission case through a second bearing, and the first bearing and the second bearing are disposed inside the inner circumference the rotor of the motor while overlapping each other in the radial direction of the front shaft.

The power train may be configured such that a motor speed sensor is disposed between the rotor shaft of the motor and the transmission case, and the motor speed sensor is positioned inside the inner circumference of the rotor.

According to another embodiment, a power train of a hybrid vehicle includes an engine that is connected with a clutch through an engine shaft connected to an engine crankshaft, a motor that is operated by electric energy and connected to another clutch, and a transmission of which an input shaft is connected with the clutches to receive driving force of the engine and the motor, wherein one or more of the clutches are disposed inside the inner circumference of the motor and the clutches share portions of parts included in each of the clutches.

The power train may be configured such that torsional damper is disposed between the engine and the clutches.

According to still another embodiment, a power train of a hybrid vehicle includes an engine that is connected with a clutch through an engine shaft connected to an engine crankshaft, a motor that is operated by electric energy and connected to another clutch, a transmission of which an input shaft is connected with the clutches to receive driving force of the engine and the motor, and a motor speed sensor that detects the speed of the motor, wherein at least one or more of the clutches overlap each other inside the inner circumference of the motor.

The power train may be configured such that the motor speed sensor is positioned closer to the clutches than the outer circumference of the motor.

According to a further embodiment, a power train of a hybrid vehicle includes an engine that is connected with a clutch through an engine shaft connected to an engine crankshaft, a motor that is operated by electric energy, supported by a bearing, and connected to another clutch, and a transmission of which an input shaft is connected with the clutches to receive driving force of the engine and the motor, wherein at least one or more of the clutches overlap each other inside the inner circumference of the motor.

The power train may be configured such that the bearing is positioned closer to the input shaft of the transmission than the motor.

According to a still further embodiment, a power train of a hybrid vehicle includes an engine that is connected with a clutch through an engine shaft connected to an engine crankshaft, a motor that is operated by electric energy and connected to another clutch, a transmission that receives driving force of the engine and the motor through an input shaft; and a clutch retainer of which a portion is included in a clutch connecting the motor with the transmission, of which one side is supported by a bearing and the outer circumference supports the motor toward the outer circumference, wherein at least one or more of the clutches overlap each other inside the inner circumference of the motor.

The power train may be configured such that the clutch retainer is disposed inside the inner circumference of the motor and positioned closer to the motor than the clutch connecting/disconnecting the engine with the transmission.

According to the embodiments, since a rotor shaft of a motor can be connected/disconnected with/from an input shaft of a transmission, it is possible to reduce or block vibration and noise between the motor and the transmission, thereby improving durability of the motor and achieving smooth gearshift. Further, when a vehicle is driven with the engine directly connected with the input shaft of the transmission, it is possible to easily implement driving sub-control and regenerative braking control by the motor, thereby achieving good properties against noise and vibration.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

For better understanding of the nature and objects of the present invention, reference should be made to the following detailed description with the accompanying drawings, in which.

DETAILED DESCRIPTION

Figure 1:
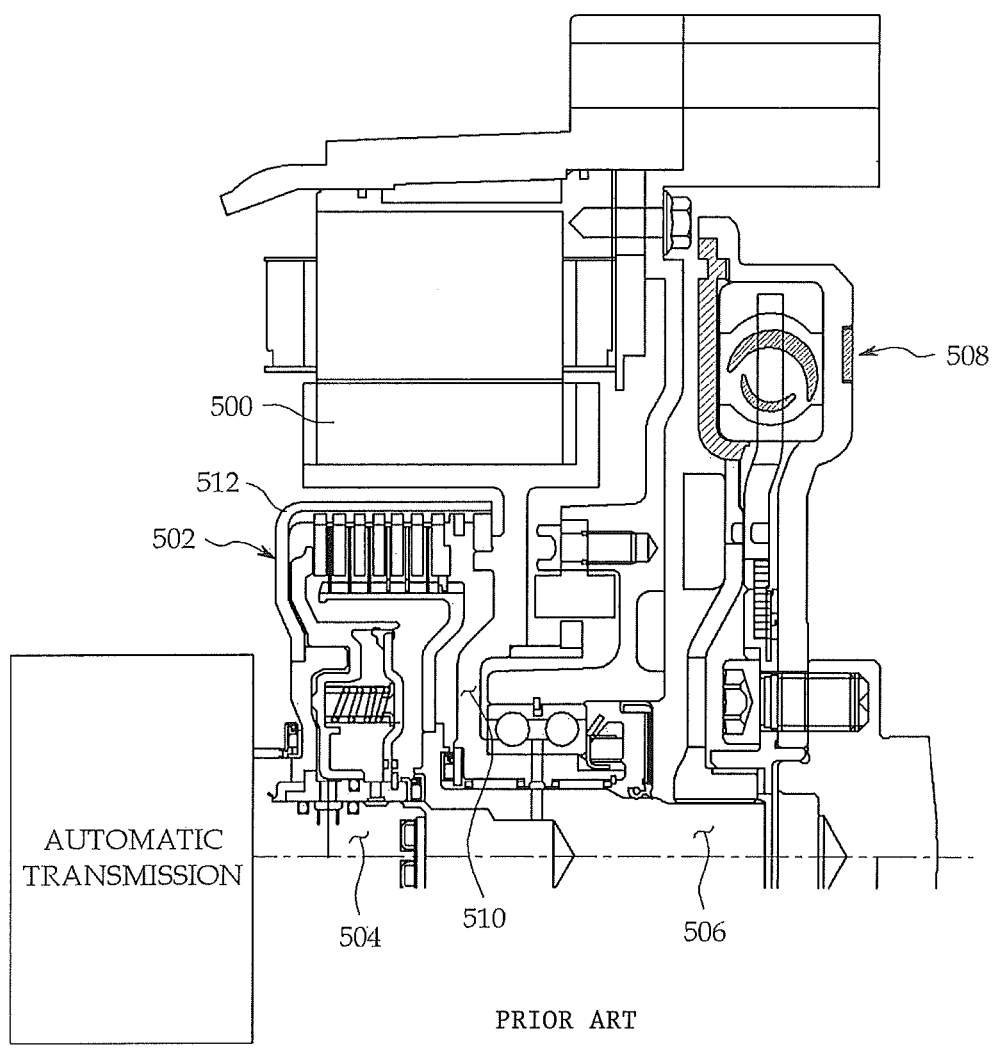
FIG. 1 is a view illustrating the structure of a conventional power train of a hybrid vehicle.
Figure 2:
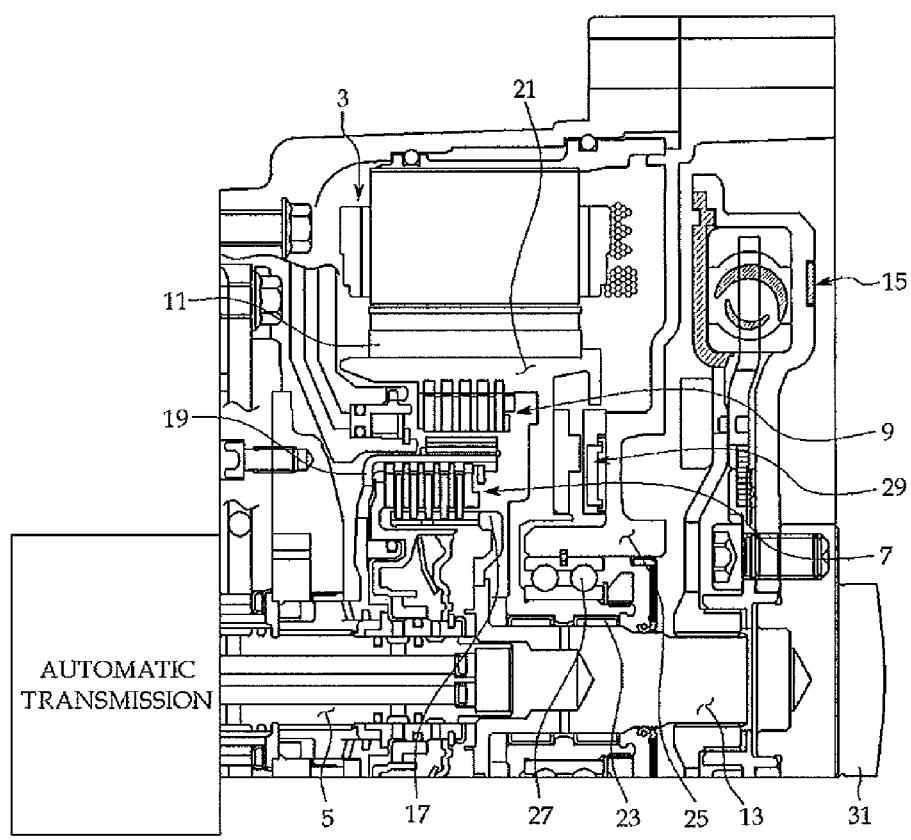
FIG. 2 is a detailed cross-sectional view illustrating the structure of a power train of a hybrid vehicle according to an embodiment of the present invention.
Figure 3:
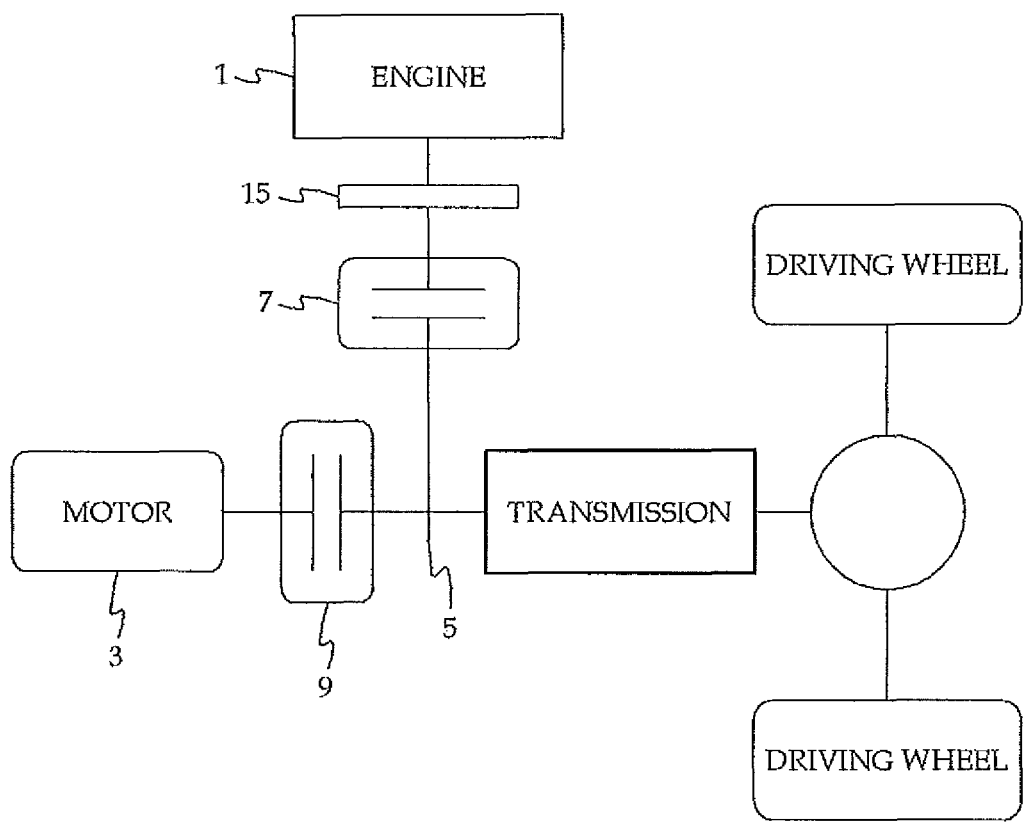
FIG. 3 is a conceptual simplified schematic view of FIG. 2 illustrating the structure of the power train of the hybrid vehicle according to the embodiment of the present invention.

Referring to FIGS. 2 and 3, a power train of a hybrid vehicle according to an embodiment of the present invention includes an internal combustion engine 1, a motor 3 that is driven by electric energy, a first clutch 7 that selectively transmits power of the engine 1 to a transmission input shaft 5, and a second clutch 9 that selectively transmits power of the motor 3 to the transmission input shaft 5.

The first clutch 7 is disposed radially inside a rotor 11 of the motor 3. The second clutch 9, which has a larger diameter than the first clutch 7, is disposed radially inside the rotor 11 of motor 3.

A front shaft 13 is coaxially disposed in series at the front end of the transmission input shaft 5. The front shaft 13 is spline-connected with a torsional damper 15 connected with the engine 1. The first clutch 7 includes a hub 17 connected to the front shaft 13, a retainer 19 connected to the transmission input shaft 5, and a plurality of clutch plates and clutch discs disposed between the hub 17 and the retainer 19.

The engine 1 is connected with the first clutch 7 through an engine shaft 31 connected to a crankshaft.

The second clutch 9 includes the retainer 19, a rotor shaft 21 of the motor 3, and a plurality of clutch plates and clutch discs disposed between the retainer 19 and the rotor shaft 21 of the motor 3.

That is, the retainer 19 of first clutch 7 also functions as a hub of the second clutch 9. As a result, the first clutch 7 is disposed inside the retainer 19 directly connected to the transmission input shaft 5 to selectively transmit the power of the engine 1 to the transmission input shaft 5, and the second clutch 9 is disposed outside the retainer 19 to selectively transmit the power of the motor 3 to the transmission input shaft 5.

In other embodiments, either or both of the first clutch 7 and the second clutch 9 may be disposed outside the inner circumference of the motor 3.

The inner circumference of the rotor shaft 21 of the motor 3 is supported by the outside of the front shaft 13 through a first bearing 23 and the outer circumference is supported by a transmission case 25 through a second bearing 27, in which the first bearing 23 and the second bearing 27 are disposed inside the inner circumference of the rotor of the motor 3 while overlapping each other in the radial direction of the front shaft 13.

In addition to supporting a rotary shaft of the rotor, rotor shaft 21 of the motor functions as a clutch retainer constituting a portion of the second clutch 9.

A motor speed sensor 29 may be disposed between the rotor shaft 21 of motor 3 and the transmission case 25, and positioned inside the inner circumference of the rotor 11.

Accordingly, in addition to the first clutch 7 and the second clutch 9, the first bearing 23 and the second bearing 27 supporting the rotor shaft 21 of the rotor 11 and the motor speed sensor 29 may be disposed inside the inner circumference of the rotor 11 of the motor 3, such that it is possible to achieve a compact configuration and decrease the entire length of the power train, thereby making it easier to mount the power train to a vehicle.

For reference, the first clutch 7 and the second clutch 9 may be simply referred to as a clutch, the first bearing 23 and the second bearing 27 may be simply referred to as a bearing, and the rotor shaft 21 of the motor may be referred to as a clutch retainer, because it also has the function of a retainer of a clutch.

According to the embodiments, since the motor 3 and the transmission input shaft 5 can be connected/disconnected by the second clutch 9, it is possible to reduce and transmit vibration of the motor 3 to the second clutch 9 or block the vibration. Further, when the gear is shifted and the required torque of a vehicle changes in re-acceleration after deceleration, it is possible to reduce vibration caused by this operation by slip-controlling the first clutch 7 and the second clutch 9, thereby ensuring smooth gearshift. Further, it is possible to prevent shock reversely transmitted from the driving wheels or the transmission from being transmitted to the motor 3, which is advantageous in improving the durability of the motor 3.

Meanwhile, when the vehicle is driven with the engine 1 directly connected to the transmission input shaft 5, it is possible to independently control the second clutch 9 in driving sub-control and regenerative braking control by the motor 3, which makes it possible to implement easier control and ensure good anti-noise and anti-vibration properties.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A power train of a hybrid vehicle, comprising:
an internal combustion engine;
a motor that is driven by electric energy;
a first clutch that is disposed on a first surface of a retainer integrally mounted on a transmission input shaft of an automatic transmission to selectively transmits power of the engine directly to the transmission input shaft wherein the first clutch is disposed radially inside a rotor of the motor; and
a second clutch that is disposed on a second surface of the retainer opposite the first surface to selectively transmits power from the motor to the same transmission input shaft as the first clutch wherein the second clutch is disposed radially inside the rotor of the motor, the diameter of the second clutch larger than that of the first clutch,
wherein the first clutch and the second clutch are disposed to be sequentially arranged along a radial direction of the transmission input shaft,
wherein the inner circumference of a rotor shaft of the motor is supported by an outside of a front shaft through a first bearing and an outer circumference is supported by a transmission case through a second bearing, the first bearing and the second bearing disposed inside the inner circumference of the rotor of the motor while overlapping each other in the radial direction of the front shaft,
wherein a motor speed sensor is disposed between the rotor shaft of the motor and the transmission case, and the motor speed sensor is positioned inside the inner circumference of the rotor, and
wherein the first clutch and the second clutch, the first bearing and the second bearing supporting the rotor shaft of the rotor and the motor speed sensor are disposed inside the inner circumference of the rotor of the motor.

2. The power train of a hybrid vehicle as defined in claim 1, wherein the front shaft is coaxially disposed in series at the front end of the transmission input shaft,
the front shaft is provided with a torsional damper connected with the engine,
the first clutch includes a hub connected to the front shaft, the retainer connected to the transmission input shaft, and a plurality of clutch plates and clutch discs disposed between the hub and the retainer, and
the second clutch includes the retainer, a rotor shaft of the motor, and a plurality of clutch plates and clutch discs disposed between the retainer and the rotor shaft of the motor.

* * * * *